United States Patent
Seagren et al.

(10) Patent No.: US 12,428,998 B2
(45) Date of Patent: Sep. 30, 2025

(54) AIRCRAFT ENGINE START USING MULTIPLE COMMON MOTOR CONTROLLERS

(71) Applicant: Hamilton Sundstrand Corporation, Charlotte, NC (US)

(72) Inventors: Robert L. Seagren, Rockford, IL (US); Dhaval S. Patel, Schaumburg, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 167 days.

(21) Appl. No.: 18/491,383

(22) Filed: Oct. 20, 2023

(65) Prior Publication Data

US 2025/0129749 A1  Apr. 24, 2025

(51) Int. Cl.
| | |
|---|---|
| *H02P 9/30* | (2006.01) |
| *B64D 33/00* | (2006.01) |
| *F02C 7/26* | (2006.01) |
| *H02P 5/74* | (2006.01) |
| *H02P 9/08* | (2006.01) |

(52) U.S. Cl.
CPC ............... *F02C 7/26* (2013.01); *B64D 33/00* (2013.01); *H02P 5/74* (2013.01); *F05D 2260/85* (2013.01)

(58) Field of Classification Search
CPC ...... H02P 5/74; H02P 9/30; H02P 9/08; H02P 2101/00; H02P 2101/30; B64D 33/00; F02C 7/26; F05D 2260/85
USPC .......................................................... 318/3
See application file for complete search history.

(56) References Cited

U.S. PATENT DOCUMENTS

| | | | | |
|---|---|---|---|---|
| 4,743,777 A | * | 5/1988 | Shilling | H02P 9/08 322/29 |
| 5,097,195 A | * | 3/1992 | Raad | F02N 11/04 290/46 |
| 5,387,859 A | * | 2/1995 | Murugan | H02M 5/4585 290/46 |

(Continued)

FOREIGN PATENT DOCUMENTS

| | | |
|---|---|---|
| EP | 2801719 A1 | 11/2014 |
| EP | 3197043 A1 | 7/2017 |

OTHER PUBLICATIONS

Search Report issued in European Patent Application No. 24207626.3; Date of Mailing Mar. 14, 2025 (9 pages).

*Primary Examiner* — Gabriel Agared
(74) *Attorney, Agent, or Firm* — CANTOR COLBURN LLP

(57) ABSTRACT

An engine start system for an aircraft includes a first variable frequency start generator (VFSG) including a first exciter and a first stator, a second VFSG including a second exciter and a second stator, a first motor controller and a second motor controller, and a switching system. The switching system is configured to operatively connect the first motor controller to the first stator or the second exciter and operatively connect the second motor controller to the first exciter or the second stator. In a first mode of operation, the first motor controller is operatively connected to the second exciter, the second motor controller is operatively connected to the second stator, the first VFSG generates power, the first motor controller provides a first controlled voltage and frequency to the second exciter, and the second motor controller provides a second controlled voltage and frequency to the second stator.

17 Claims, 7 Drawing Sheets

(56) References Cited

U.S. PATENT DOCUMENTS

| | | | | |
|---|---|---|---|---|
| 5,594,322 | A * | 1/1997 | Rozman | H02P 9/08 |
| | | | | 322/29 |
| 7,513,119 | B2 | 4/2009 | Zielinski et al. | |
| 7,514,806 | B2 * | 4/2009 | Xu | H02P 9/302 |
| | | | | 290/31 |
| 8,018,086 | B2 | 9/2011 | Legros | |
| 8,796,871 | B2 | 8/2014 | De Wergifosse | |
| 8,928,293 | B1 * | 1/2015 | Rozman | H02P 9/14 |
| | | | | 322/29 |
| 2005/0212466 | A1 * | 9/2005 | Rozman | F02N 11/04 |
| | | | | 318/98 |
| 2007/0222220 | A1 * | 9/2007 | Huang | F02N 11/04 |
| | | | | 290/31 |
| 2010/0295301 | A1 * | 11/2010 | Huang | F02N 11/04 |
| | | | | 290/31 |

* cited by examiner

AIRCRAFT ENGINE START USING MULTIPLE COMMON MOTOR CONTROLLERS

BACKGROUND

The subject matter disclosed herein generally relates to engine start systems for gas turbine engines and, more particularly, to engine start systems used on aircraft.

Vehicles, such as aircraft, employ starter/generators for both starting the aircraft engine and generating electrical power for aircraft electrical systems subsequent to starting. A controller commonly cooperates with the starter/generator to convert power flowing to the starter/generator. For example, during engine starting (start mode) the controller generally converts external power into a form suitable for rotating the gas turbine engine rotor using the starter/generator. Once the gas turbine engine has started, the controller then causes the starter/generator to be fed power in a form so that the starter/generator operates in a manner so that it generates power. This operation is referred to as a generate mode herein.

One example of a starter/generator is a variable frequency starter generator (VFSG). Some VFSG systems are capable of operating in both the two above referred start and generate mode. A typical VFSG includes a three-phase start exciter to enable excitation at zero to low speeds. During start mode, three phase AC power is applied to the VFSG exciter coils to energize the main field. In such a case, the exciter coils are directly hooked up to the 235Vrms aircraft AC bus, which results in the VFSG getting 235 $V_{ACL-N}$ voltage at a frequency ranging from 360 Hz to 800 Hz. While this can work well for starting, when in the generate mode, providing three phase power to the exciter coils can result in the back EMF increasing.

Techniques for providing excitation power (e.g., current/voltage) to a VFSG are desired which address drawbacks associated with other approaches.

BRIEF DESCRIPTION

An engine start system for an aircraft is disclosed. The engine start system includes: a first variable frequency start generator (VFSG) that includes a first exciter and a first stator; a second VFSG that includes a second exciter and a second stator; a first motor controller and a second motor controller; and a switching system. The switching system is configured to: operatively connect the first motor controller to the first stator or the second exciter; and operatively connect the second motor controller to the first exciter or the second stator. In a first mode of operation of the engine start system, the switching system is configured such that: the first motor controller is operatively connected to the second exciter based on a first switch configuration of the switching system; the second motor controller is operatively connected to the second stator based on the first switch configuration; and the first VFSG generates power. In the first mode of operation of the engine start system, the first motor controller provides a first controlled voltage and frequency to the second exciter based on at least one of: the power generated by the first VFSG; and other power generated by a power source different from the first VFSG; and the second motor controller provides a second controlled voltage and frequency to the second stator based on the power generated by the first VFSG.

In some embodiments, in a second mode of operation of the engine start system, the switching system is configured such that: the first motor controller is coupled to the first stator based on a second switch configuration of the switching system; the second motor controller is coupled to the first exciter based on the second switch configuration; the second VFSG generates second power; the second motor controller provides a third controlled voltage and frequency to the first exciter based on the second power generated by the second VFSG; and the first motor controller provides a fourth controlled voltage and frequency to the first VFSG based on the second power generated by the second VFSG.

In any one or combination of the foregoing embodiments, in the first mode of operation of the engine start system, the switching system is configured such that: the first exciter is electrically coupled to first generator control circuitry of the engine start system; and the first VFSG generates the power based on a DC excitation of the first exciter by the first generator control circuitry.

In any one or combination of the foregoing embodiments, in a second mode of operation of the engine start system, the switching system is configured such that: the first exciter is electrically coupled to first generator control circuitry of the engine start system; the first VFSG generates the power based on a DC excitation of the first exciter by the first generator control circuitry; the second exciter is electrically coupled to second generator control circuitry of the engine start system; and the second VFSG generates second power based on a DC excitation of the second exciter by the second generator control circuitry.

In any one or combination of the foregoing embodiments, the first controlled voltage and frequency and the second controlled voltage and frequency are each a three-phase controlled voltage and frequency.

In any one or combination of the foregoing embodiments, a first configuration of the switching system is associated with the first mode.

In any one or combination of the foregoing embodiments, the switching system is configured to: operatively connect the first motor controller to the first VFSG or the second VFSG; and operatively connect the second motor controller to the first VFSG or the second VFSG.

In any one or combination of the foregoing embodiments, the first exciter and the second exciter are each a three-phase exciter, and where in the first mode of operation of the engine start system, the switching system is configured such that: the first exciter is in a direct current (DC) excitation mode; and the second exciter is in a three-phase excitation mode.

Also disclosed is a method of controlling an engine start system of an aircraft including a first VFSG and a second VFSG. The method includes, in a first mode of operation of the engine start system: operatively connecting a first motor controller to an exciter of the engine start system, based on a first switch configuration associated with the first mode of operation, where: the first motor controller is included in the engine start system; and the exciter is included in the second VFSG. The method includes: operatively connecting a second motor controller to a stator of the second VFSG based on the first switch configuration; and generating, by the first VFSG, power. The method includes providing, by the first motor controller, a first controlled voltage and frequency to the exciter included in the second VFSG, based on at least one of: the power generated by the first VFSG; and other power generated by a power source different from the first VFSG. The method includes providing, by the second motor controller, a second controlled voltage and frequency to the stator of the second VFSG based on the power generated by the first VFSG, where the first mode of operation is associated with starting at least one gas turbine engine of the aircraft.

In some embodiments, in a second mode of operation of the engine start system: operatively connecting the second motor controller to an exciter included in the first VFSG, based on a second switch configuration associated with the second mode of operation; operatively connecting the first motor controller to a stator of the first VFSG based on the second switch configuration; generating, by the second VFSG, second power; providing, by the second motor controller, a third controlled voltage and frequency to the exciter included in the first VFSG, based on the second power generated by the second VFSG; and providing, by the first motor controller, a fourth controlled voltage and frequency to the first VFSG based on the second power generated by the second VFSG, where the second mode of operation is associated with starting the at least one gas turbine engine of the aircraft.

In any one or combination of the foregoing embodiments, the method further includes: electrically coupling the exciter to first generator control circuitry of the engine start system based on the first switching configuration; and controlling, by the first generator control circuitry, a DC excitation of the first exciter, where the first VFSG generates the power based on the DC excitation of the exciter.

In any one or combination of the foregoing embodiments, the method further includes, in a second mode of operation of the engine start system: electrically coupling the exciter to first generator control circuitry of the engine start system based on a second switching configuration associated with the second mode of operation; controlling, by the first generator control circuitry, a DC excitation of the exciter, where the first VFSG generates the power based on the DC excitation of the exciter; electrically coupling an exciter included in the first VFSG to second generator control circuitry of the engine start system based on the second switch configuration; and controlling, by the second generator control circuitry, a DC excitation of the exciter included in the first VFSG, where the second VFSG generates second power based on the DC excitation of the exciter included in the first VFSG.

In any one or combination of the foregoing embodiments, the first controlled voltage and frequency and the second controlled voltage and frequency are each a three-phase controlled voltage.

In any one or combination of the foregoing embodiments, the method further includes controlling switching circuitry based on the first mode and the first switching configuration, where operatively connecting the first motor controller and the exciter, operatively connecting the second motor controller to the second VFSG, or both is based on controlling the switching circuitry.

Also disclosed is an aircraft electrical architecture including: a VFSG; an exciter; and at least one gas turbine engine. The VFSG is operable to generate power in a first mode of operation associated with the aircraft electrical architecture. The VFSG is operable to generate a force associated with rotating a shaft included in the at least one gas turbine engine in a second mode of operation associated with the aircraft electrical architecture, based on second power provided by an auxiliary power source associated with the aircraft electrical architecture.

In any one or combination of the foregoing embodiments, the auxiliary power source includes at least one of: a second VFSG included in the aircraft electrical architecture; and a power generator different from the second VFSG.

In any one or combination of the foregoing embodiments: the second VFSG is operable to generate a second force associated with rotating the shaft in the first mode of operation, based on the power generated by the first VFSG or third power provided by a second auxiliary power source external to the aircraft electrical architecture; and the second VFSG is operable to generate the second power in the second mode of operation.

In any one or combination of the foregoing embodiments, the aircraft electrical architecture further includes a motor controller, where in the first mode of operation: the motor controller is operable to provide a controlled voltage and frequency to the exciter based on the power generated by the VFSG, where the exciter is included in the second VFSG; and the second VFSG generates a second force associated with rotating the shaft in the first mode, based on the controlled voltage.

In any one or combination of the foregoing embodiments, the aircraft electrical architecture further includes a motor controller, where in the second mode of operation: the motor controller is operable to provide a controlled voltage and frequency to the exciter based on the second power provided by the auxiliary power source; and the second VFSG generates a second force associated with rotating the shaft in the second mode, based on the controlled voltage.

In any one or combination of the foregoing embodiments, the aircraft electrical architecture further includes: a motor controller; and a starter switching system configured to operatively connect the motor controller to the exciter or a second exciter, where the exciter is included in a second VFSG of the aircraft electrical architecture, and the second exciter is included in the first VFSG.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

According to one or more embodiments of the present disclosure, an electrical system architecture is provided that supports performing an engine start using multiple motor controllers, and the engine start techniques provide improved control of a start sequence to the VFSG.

Figure 1A:
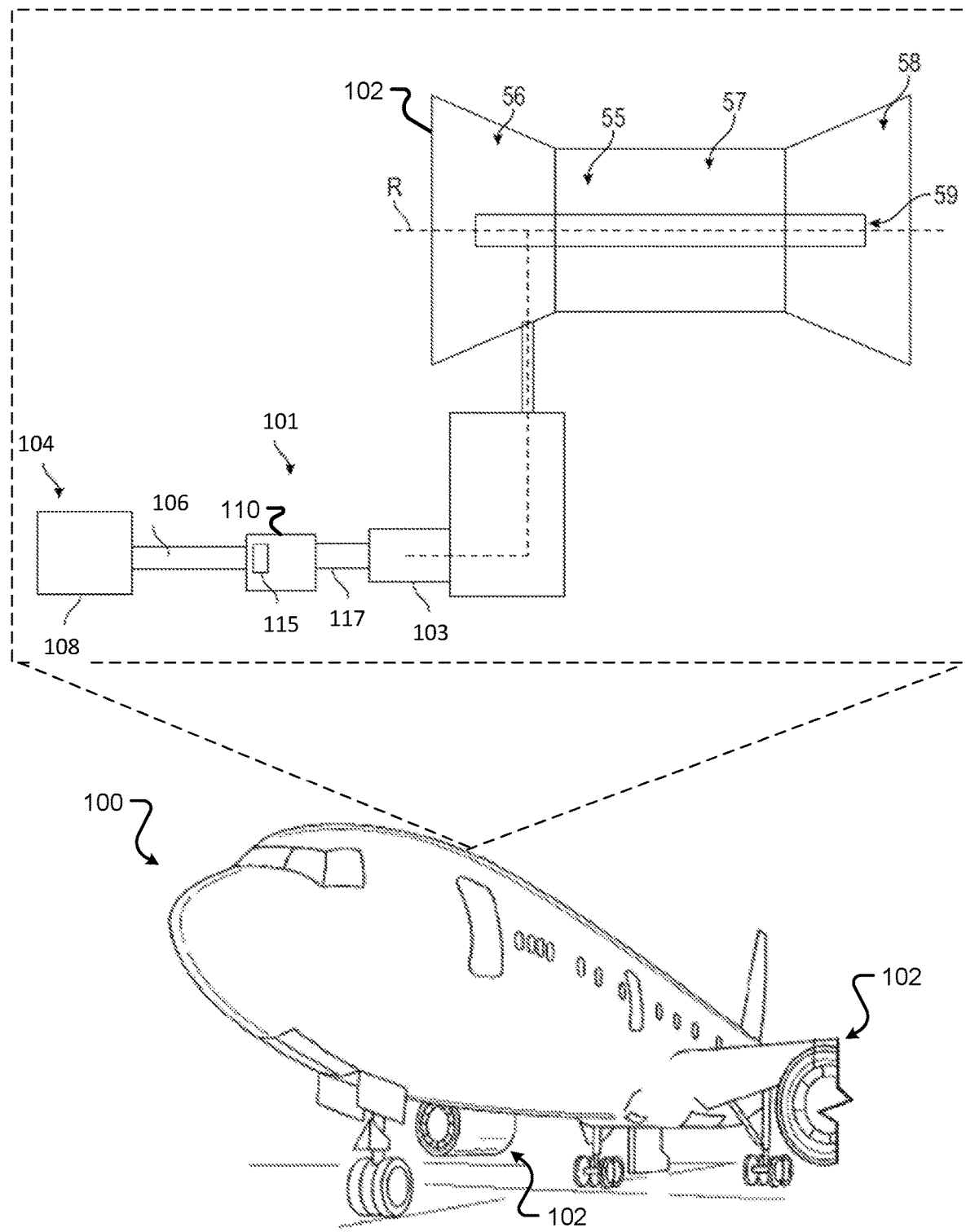
FIG. 1A is a schematic illustration of an aircraft that can incorporate various embodiments of the present disclosure.

FIG. 1A is a schematic illustration of an aircraft that can incorporate various embodiments of the present disclosure. Referring to FIG. 1A, a vehicle, e.g., an aircraft 100, is shown. The aircraft 100 includes the starter/generator arrangement 101, a gas turbine engine 102 (also referred to herein as a turbine engine or a turbine), and an electrical system 104.

The electrical system 104 includes a power bus 106, a power source 108, and an electrical load 20. The power bus 106 electrically connects the starter/generator arrangement 101 to the power source 108 and the VFSG 110. It is also contemplated that the power bus 106 communicates from the power source 108 to the VFSG 110 during the start mode. The power source 108 can be either DC or AC. In the event it is AC it can provide differing voltage values. To that end, the power source 108 can be a battery in one embodiment and a generator in another.

Further details of the VFSG 110 are described below but in general, the controller 115 includes one or more circuits that can convert input power (e.g., from the power source or a permanent magnet generator (PMG) that is part of the VFSG 110) into a form that is useful to operate the VFSG 110 in both start and generate modes.

The gas turbine engine 102 includes a fan section 56, a compressor section 55, a combustor section 57, and a turbine section 58. The fan is supported for rotation about a rotation axis R and is operatively associated with the turbine section 58 by a shaft 59. Although a particular gas turbine engine arrangement is shown and described herein it is to be understood and appreciated that gas turbines having other arrangements can also benefit from the present disclosure.

The starter/generator arrangement 101 generally includes a VFSG 110, a controller 115 and an output shaft 117 (also referred to herein as a rotor 117). During start up, the excitation controller provides three phase current to the field coils/windings of the VFSG 110. This causes the shaft 117 to rotate and, thus, causes the turbine shaft 59 to begin rotating so that it can start. Once the gas turbine engine 102 is operating, it produces rotational energy that can then be provided back to the VFSG 110 so that it can generate electricity to be provided to other parts of the aircraft (e.g., the running the VFSG can serve to generate electrical power due to rotational energy).

In the illustrated example the gas turbine engine 102 includes an accessory gearbox 103. The accessory gearbox 103 mechanically connects the VFSG 110 and the gas turbine engine 102. Subsequent to starting, e.g., when the VFSG 110 is in the generate mode, the accessory gearbox 103 communicates rotational energy to the VFSG 110. As noted above, the VFSG 110 converts the rotational energy into the electrical power. Further, during startup, the gear box 103 receives rotational energy from the VFSG 110 via the output shaft 117 and provides it to the gas turbine engine 102 to start the gas turbine engine 102.

Figure 1B:
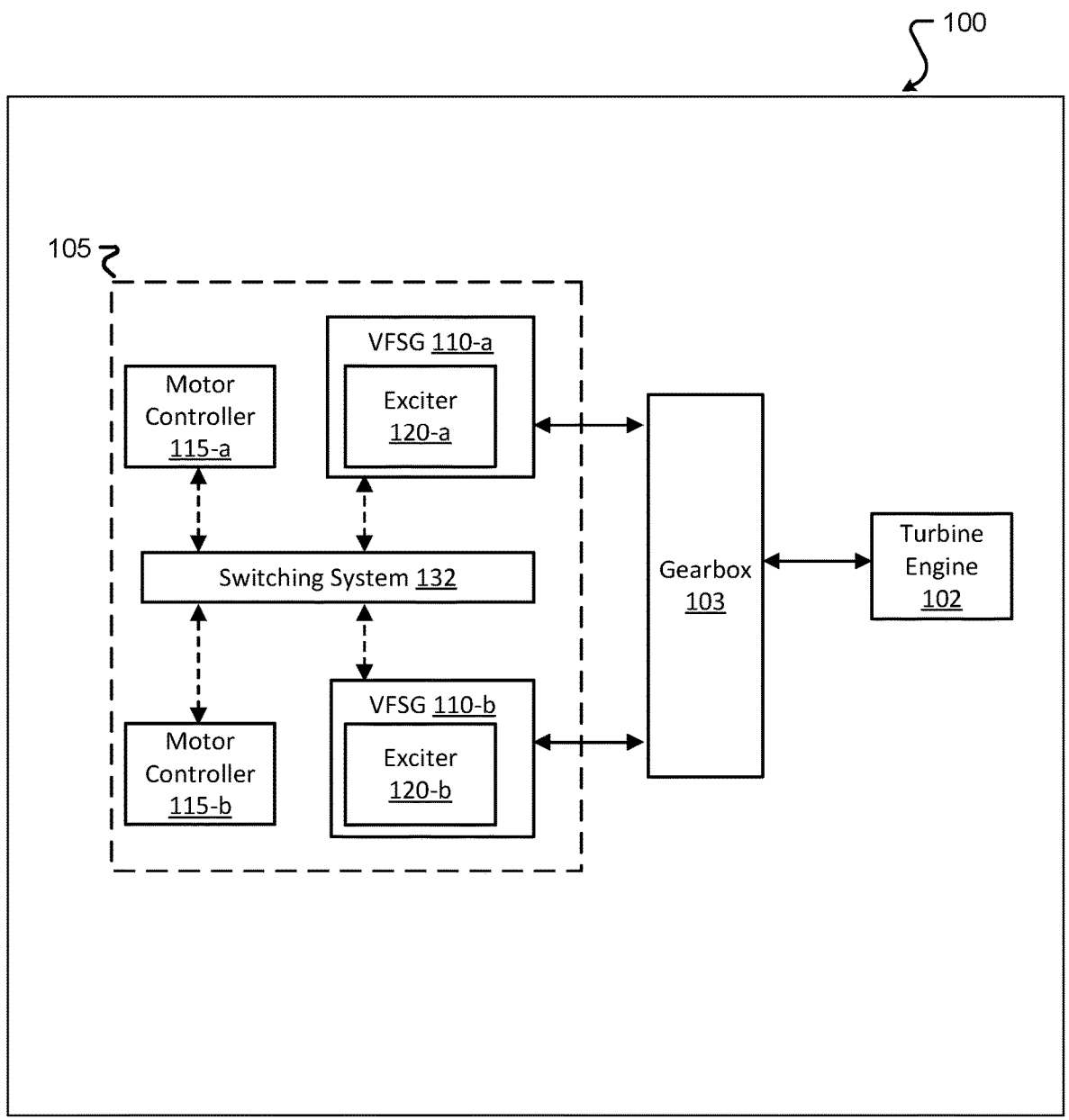
FIG. 1B is a simplified block diagram of an engine start system that can incorporate various embodiments of the present disclosure.

FIG. 1B is a simplified block diagram of an engine start system 105 of the aircraft 100 that can incorporate various embodiments of the present disclosure. The engine start system 105 is supportive of startup modes and a generate modes described herein. The engine start system 105 includes VFSGs 110 and a switching system 132 (also referred to herein as a starter switching system). The VFSGs 110 are mechanically coupled to accessory gearbox 103. Components of the switching system 132 may be referred to as switchgear herein. The engine start system 105 may include other components of the aircraft 100, which are not illustrated herein for purposes of not obstructing from other aspects of the present disclosure.

Each of the VFSGs 110 includes an exciter 120. Each VFSG may be coupled to a controller 115. For example, VFSG 110-a includes controller 115-a and exciter 120-a, and VFSG 110-b includes controller 115-b and exciter 120-b. The controllers 115 may also be referred to herein as common motor start controllers (CMSCs), common motor controllers, or motor controllers. The exciters 120 may also be referred to herein as excitation circuitry or VFSG exciters. In one or more embodiments, the switching system 132 is capable of operatively connecting the controller 115-a to the exciter 120-a or the exciter 120-b, and further, operatively connecting the controller 115-b to the exciter 120-a or the exciter 120-b.

Aspects supportive of starting the gas turbine engines 102 of the aircraft 100 based on different modes of the VFSGs 110 and different switch configurations of the switching system 132 are later described herein with reference to the FIGS. 3 through 5. In one or more embodiments, the switching system 132 includes multiple relay devices and switching devices, example aspects of which are later described herein with reference to FIGS. 3 through 5.

Figure 2:
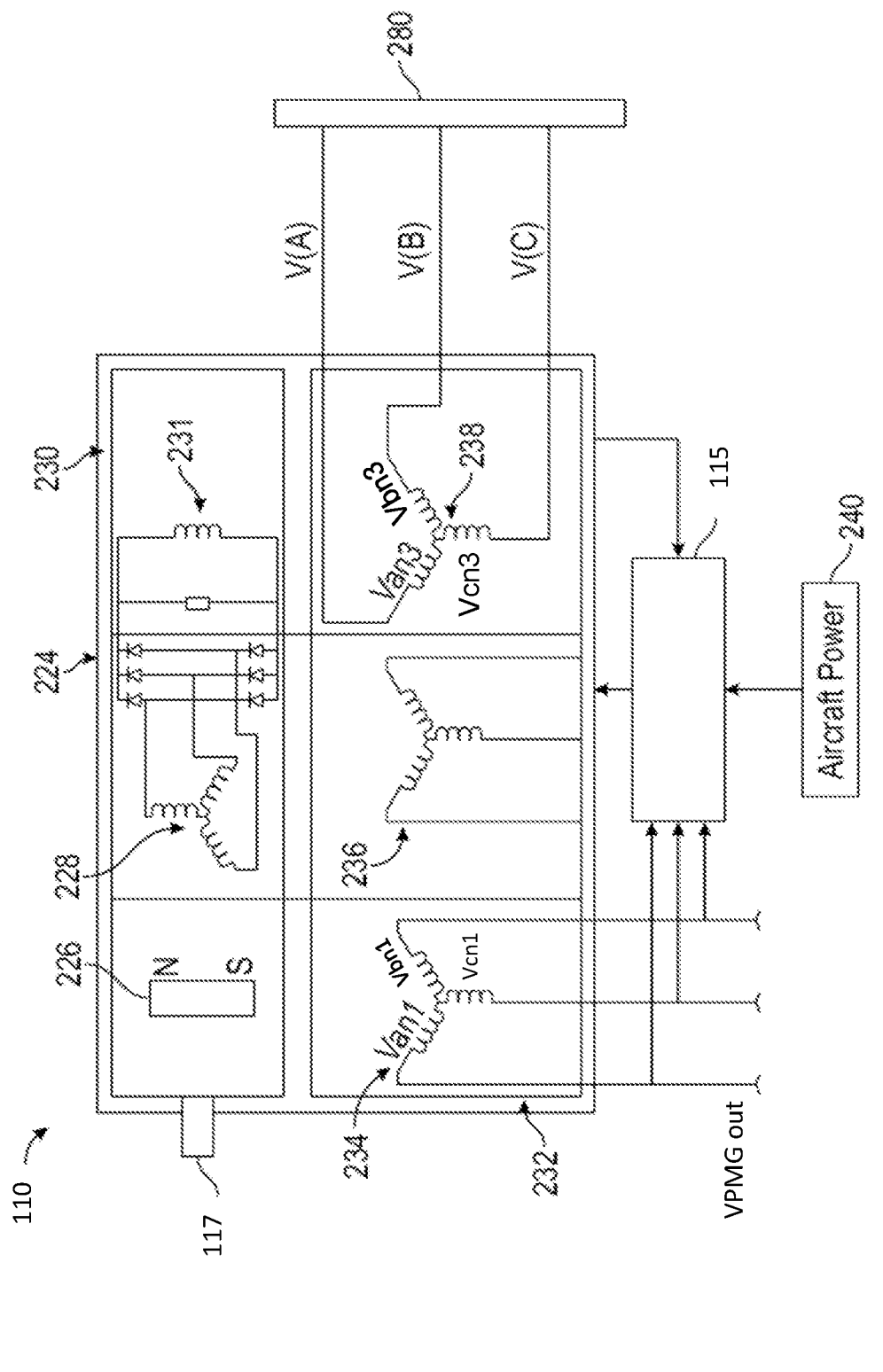
FIG. 2 shows a simplified example of a VFSG described herein.

FIG. 2 shows a simplified example 200 of a VFSG 110 (e.g., VFSG 110-b) described herein. The VFSG 110 is connected to controller 115. The controller 115 can be any controller disclosed herein and can operate to provide current to various portions of the exciter field winding(s) during both start and generate modes.

VFSG 110 includes a rotor portion 224 and stator portion 232. The rotor portion 224 includes a permanent magnet portion 226, an exciter rotor portion 228 and a main field rotor portion 230. The stator portion 232 includes a PMG stator coils 234, exciter stator portion 236, and main field stator windings 238.

As shown, the controller 115 can receive power from aircraft power 240. The aircraft power 240 can be AC or DC. For example, aircraft power 240 can be provided by another VFSG 110 (e.g., VFSG 110-a), a battery on the aircraft, power from a ground cart connected to the aircraft, or an auxiliary power unit (APU). In some cases, another VFSG 110 (e.g., VFSG 110-a) providing power may be referred to as an auxiliary start generator (ASG).

During start up, the controller 115 is configured such that the controller 115 is capable of providing three phase power to the exciter stator portion 236. While the exciter stator portion 236 is illustrated as having a three winding, the exciter stator portion 236 can operate in the generate mode in which only one phase is powered. Operating in the generate mode in which only one phase is powered causes a rotating magnetic field that interacts with three-phase coils in the exciter rotor portion 228. The interaction will induce AC voltage in the exciter rotor windings. This induced AC voltage is then rectified to DC (on the rotor 117), which is then applied to the rotor winding of the main machine. Concurrently, the separate motor controller 280 applies appropriate high voltage/current on the V(A), V(B), V(C) stator terminals of the main machine. The interaction between the main stator rotating magnetic field produced by the three-phase AC voltages applied by the motor controller 280, and the DC magnetic field on the main rotor causes the rotor 117 to rotate. This rotation can be used to get the gas turbine engine 102 of FIG. 1A to begin rotation and then, eventually, started.

After the gas turbine engine 102 has reached an operation speed, the controller 115 can operate the VFSG 110 in the generate mode. In the generate mode, the turbine engine 102

(via rotor 117) provides mechanical energy to rotor portion 224, causing permanent magnet portion 226, exciter rotor portion 228, and main field rotor portion 230 to rotate. The rotation of permanent magnet portion 226 generates an alternating current (AC) voltage in PMG stator coils 234, labeled Van1, Vbn1, and Vcn1. The outputs of PMG stator coils 234 are provided to controller 115, which rectifies the AC input and provides a DC excitation current to exciter stator portion 236. These output voltages may collectively be referred to 'VPMG out.' For convenience, the PMG portions 226/234 can be referred to as a PMG herein.

Based on the magnitude of the excitation current provided to exciter stator portion 236, the exciter rotor portion 228 generates an AC output that is rectified and provided to main field rotor portion 230 to couple the exciter stator current to the main field rotor current by rotation. In response to the rotating field established by main field rotor portion 230, and in particular, coil 231, the main field stator windings 238 generate a variable frequency (based on the speed of the rotor 117) main AC voltages labeled Van3, Vbn3, and Vcn3. The main AC voltages Van3, Vbn3, and Vcn3 may then be provided as an output in which they are labeled AC output voltages V(A), V(B), and V(C). For convenience, exciter rotor portion 228, the PMG stator coils 234, exciter stator portion 236, main field stator windings 238, can be referred to as an exciter 120. For example, aspects of the exciter rotor portion 228, the PMG stator coils 234, exciter stator portion 236, main field stator windings 238 may be implemented by an exciter 120 (e.g., exciter 120-a, exciter 120-b) as described herein with reference to FIGS. 1B, 3, 4, and 5.

Figure 3:
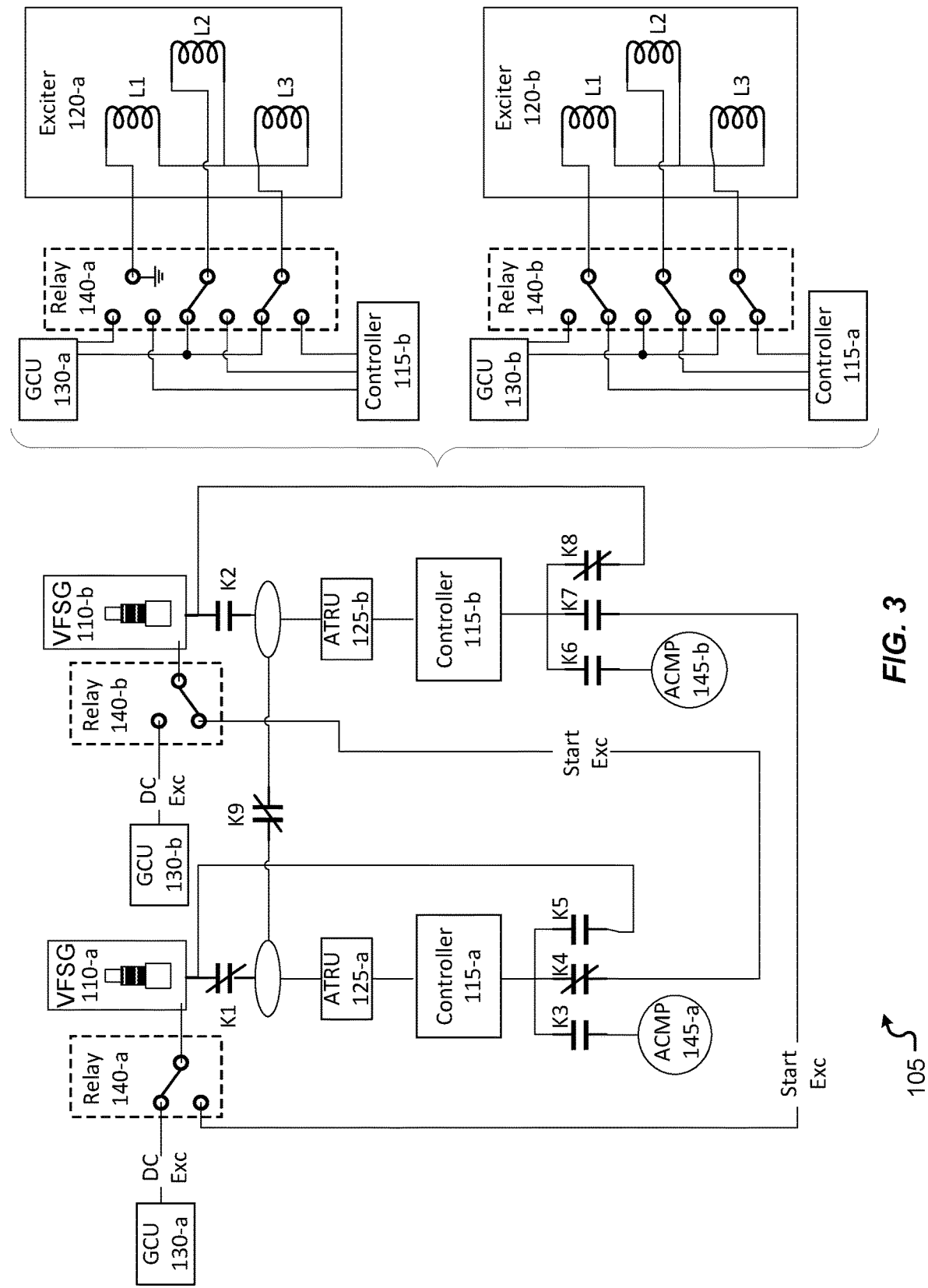
FIG. 3 illustrates a configuration of an engine start system in accordance with one or more embodiments of the present disclosure.

FIG. 3 is an example schematic illustration of the engine start system 105 including components of the aircraft 100 in accordance with one or more embodiments of the present disclosure. FIG. 3 illustrates an example configuration of the engine start system 105 in accordance with one or more embodiments of the present disclosure.

Referring to FIG. 3, the engine start system 105 includes relay devices 140 (also referred to herein as relays or relay switches), switching devices K1 through K9, autotransformer rectifier units (ATRU) 125 (also referred to herein as autotransformer/rectifier circuitry), generator control units (GCUs) 130 (also referred to herein as generator control circuitry), exciters 120, and alternating current motor pumps (ACMPs) 145.

In some aspects, the controllers 115 are capable of controlling the start function of a VFSG 110 and regulating torque during the start sequence. In an example, the controller 115-a and controller 115-b are each capable of controlling the start function of VFSG 110-b (as will be described with reference to FIG. 3) or the start function of VFSG 110-a (as will be described with reference to FIG. 4). The controllers 115 are capable of additional functions associated with the aircraft 100 once the turbine engine 102 has been started.

In one or more embodiments, the relay devices 140 are single pole, double throw (SPDT) relays. In one or more embodiments, switching devices K1 through K9 (also referred to herein as contactors) are mechanical switches. The ACMPs 145 and switching devices K1 through K9 may be implemented by switching system 132 described herein. A master controller (not illustrated) associated with the engine start system 105 may control and coordinate the switching of switchgear (e.g., including relay devices and switching devices K1 through K9) of the engine start system 105, example aspects of which are later described herein.

The ATRUs 125 are capable of converting an AC input to a DC output. For example, the ATRUs 125 are capable of converting AC power generated by the VFSGs 110 to DC power. The ATRUs 125 may be implemented in a power converter architecture of the engine start system 105.

The GCUs 130 control respective VFSGs 110. In an example, GCU 130-a is a dedicated controller capable of controlling VFSG 110-a. Each GCU 130 is capable of providing voltage regulation and fault current limiting while a corresponding VFSG 110 is in generate mode. The GCUs 130 support the main engine start function of the aircraft 100.

The ACMPs 145 are capable of providing hydraulic power (hydraulic pressure) in association with controlling VFSGs 110, engine thrust reversers, primary flight controls, landing gear, flaps/slats, and the like of the aircraft 100.

An example of an engine start mode in accordance with one or more embodiments of the present disclosure is now described with reference to FIG. 3. In the example, VFSG 110-a is in a generate mode and VFSG 110-b is in a start mode. According to example aspects of the engine start mode described with reference to FIG. 3, VFSG 110-a provides power (e.g., aircraft power 240) to the aircraft 100.

In one or more embodiments, the excitation of each exciter 120 is tied to one of available controllers 115 (e.g., controller 115-a or controller 115-b) providing the ability to vary the voltage and frequency to the exciter 120. Referring to the example of FIG. 3, the excitation of exciter 120-a is tied to controller 115-a. In one or more embodiments, the exciters 120 are three-phase exciters and each include inductors L1, L2, and L3.

Relay device 140 and relay device 140-b are respectively implemented between two channels of the engine start system 105. In an example, the first channel is associated with VFSG 110-a, and the second channel is associated with VFSG 110-b. The systems and techniques described herein support changing the states of the relay devices 140 and switching devices K in association with providing start power from one side (e.g., the first channel) of the engine start system 105 to another side (e.g., the second channel) of the engine start system 105. Each relay device 140 is capable of coupling an exciter 120 to a motor controller 115 or a GCU 130. For example, relay device 140 is capable of electrically coupling exciter 120-a to controller 115-b or GCU 130-a, and relay device 140-b is capable of electrically coupling exciter 120-b to controller 115-a or GCU 130-b.

Additionally, or alternatively, during ground operations, the systems and techniques described herein include using an auxiliary power source (not illustrated) for providing start power, in place of one of the VFSGs 110. For example, with reference to the example of FIG. 3, the auxiliary power source is capable of providing start power to VFSG 110-b. In one or more embodiments, the auxiliary power source may be an APU generator included in the aircraft 100. In one or more embodiments, the auxiliary power source may be a battery on the aircraft 100 or a ground cart connected to the aircraft 100. In an example, the auxiliary power source is coupled to an AC bus (e.g., included at power bus 106) and is capable of providing power to the AC bus. The engine start system 105 can provide the power to either of the VFSGs 110 to start a corresponding turbine engine 102.

A master controller (not illustrated) included in the aircraft 100 controls and coordinates the switching devices K1 through K9 and relay devices 140. The master controller is capable of providing a start sequence to the associated controllers (e.g., GCU 130, a bus power control unit (BPCU) (not illustrated), motor controller 115) to close the specified switching devices K and relay devices to perform the start sequence. The BPCU controls bus configuration and engine health monitoring, provides control of the standby system, provides load management, and may serve as the electrical power system communication gateway with other systems of the aircraft 100.

In the example of FIG. 3, VFSG 110-*a* is in generate mode and VFSG 110-*b* is in start mode. The associated controllers close switching device K1, switching device K4, switching device K8, and switching device K9, and the remaining switching devices K2, K3, K5, K6, and K7 are in an open state. The associated controllers configure relay device 140-*a* such that exciter 120-*a* is coupled to GCU 130-*a*, and further, configure relay device 140-*b* such that exciter 120-*b* is coupled to controller 115-*a*.

Accordingly, for example, controller 115-*a* provides a three-phase controlled voltage and frequency to the exciter 120-*b* (e.g., via switching device K4) (at 'Start Exc'). In the example, controller 115-*b* provides a three-phase controlled voltage and frequency to the three-phase main stator (e.g., stator portion 232 of FIG. 2) of VFSG 110-*b*, via switching device K8. That is, for example, the engine start system 105 supports providing a three-phase controlled voltage and frequency to the three-phase main stator of VFSG 110-*b*, via switching device K1, switching device K9, ATRU 125-*b*, controller 115-*b*, and switching device K8.

Figure 5:
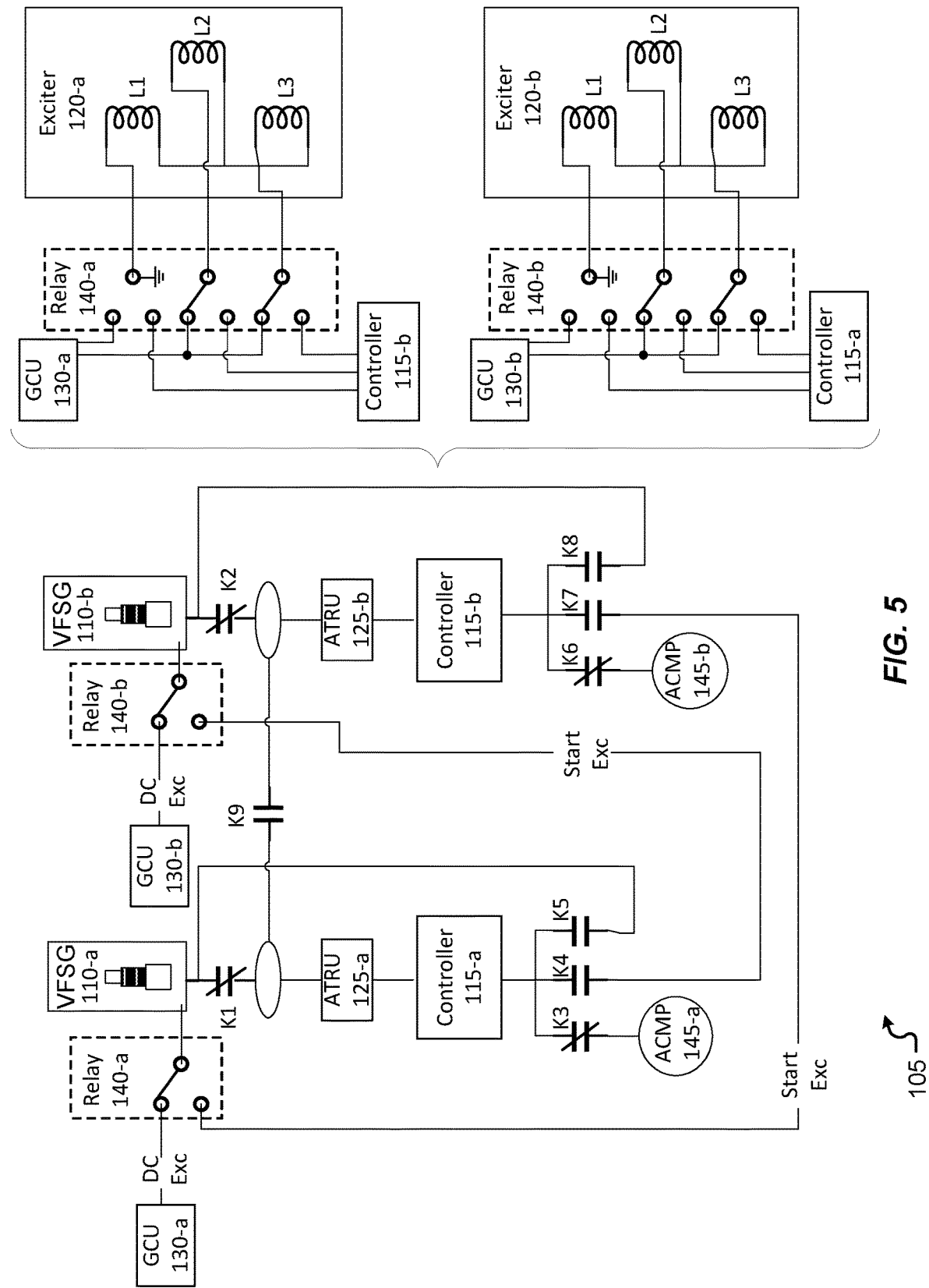
FIG. 5 illustrates an example configuration of the engine start system in accordance with one or more embodiments of the present disclosure.

Once the start sequence has been completed, the engine start system 105 may return the associated controllers to performing other suitable functions (e.g., functions different from the start sequence), and the engine start system 105 may return the switching devices K (e.g., switching device K1, switching device K4, switching device K8, and switching device K9) and the relay devices 140 to positions associated with a generate mode described herein (e.g., as described with reference to FIG. 5). For example, the master controller may provide control signals associated with returning the associated controllers to performing the other functions and/or returning the contactors and relay devices to the positions associated with the generate mode.

In one or more embodiments, for the VFSG 110-*a* in generate mode, one phase of the corresponding three-phase exciter 120-*a* is shorted (e.g., at PMG stator coils 234 and/or exciter stator portion 236 of FIG. 2) to allow for normal 2-wire DC excitation to be provided by the corresponding GCU 130-*a*. An example in which both VFSGs 110 are in the generate mode is later described with reference to FIG. 5.

As described with reference to FIG. 3, the VFSG 110-*a* is generating power traditionally as the VFSG 110-*a* is online and the GCU 130-*a* is providing control. In one or more embodiments, starting the VFSG 110-*a* may be accomplished by starting the APU, which would allow for the APU generator to be the main power source for starting the VFSG 110-*a*. In some examples, the APU generator may be started from an external power source.

Figure 4:
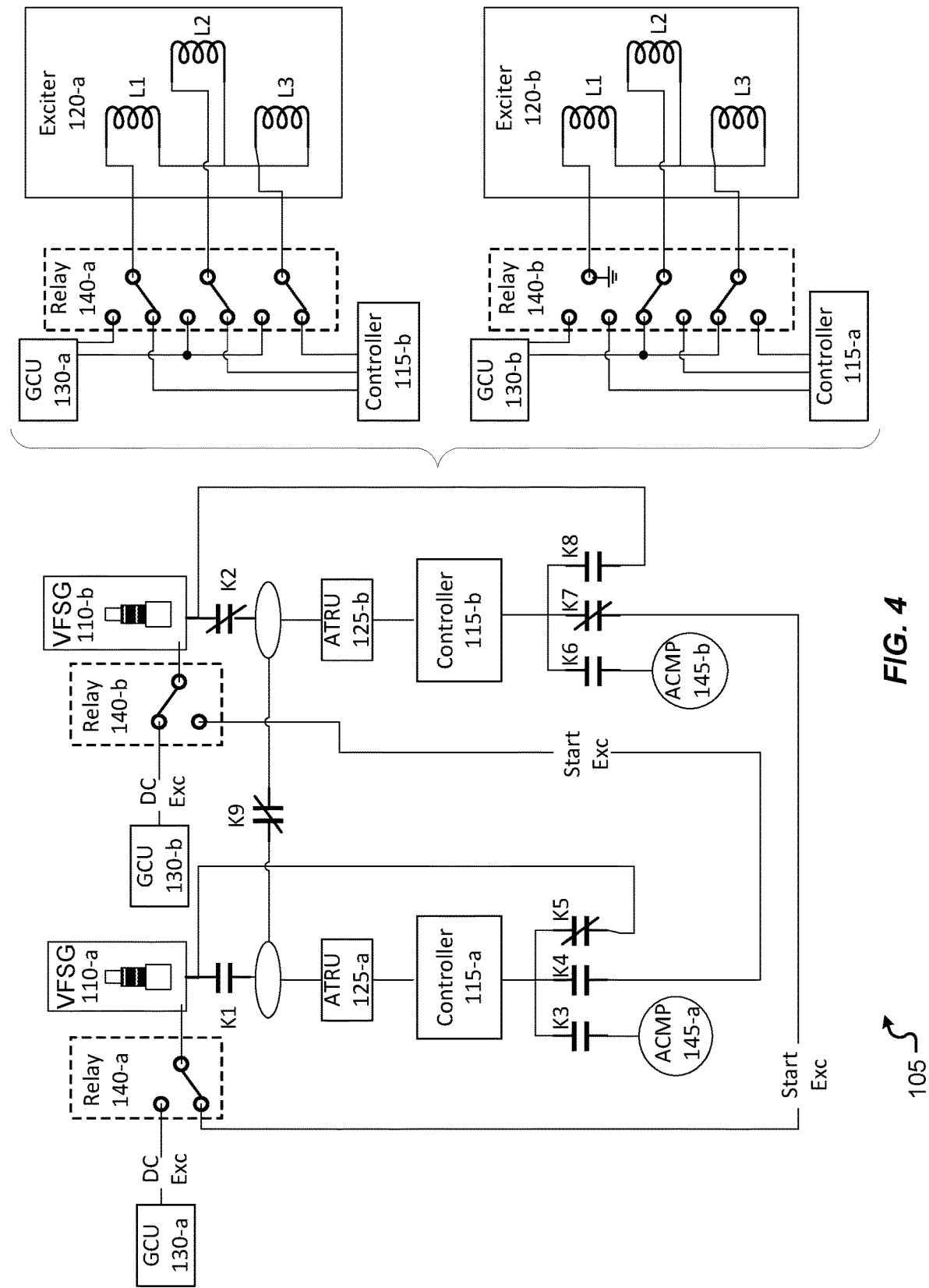
FIG. 4 illustrates a configuration of an engine start system according to an example mode in accordance with one or more embodiments of the present disclosure.

FIG. 4 illustrates a configuration of the engine start system 105 according to an example mode associated with starting the VFSG 110-*b*.

For example, with reference to FIG. 4, VFSG 110-*b* is in a generate mode and VFSG 110-*a* is in a start mode. Aspects of the generate mode of VFSG 110-*b* and the start mode of VFSG 110-*a* are the same or similar to the example aspects described with reference to the generate mode of VFSG 110-*a* and the start mode of VFSG 110-*b*, and repeated descriptions are omitted for brevity.

An example of an engine start mode in accordance with one or more embodiments of the present disclosure is now described with reference to FIG. 4. In the example of FIG. 4, VFSG 110-*b* is in generate mode and VFSG 110-*a* is in start mode. The associated controllers close switching device K2, switching device K5, switching device K7, and switching device K9, and the remaining switching devices K1, K3, K4, K6, and K8 are in an open state. The associated controllers configure relay device 140 such that exciter 120-*a* is coupled to controller 115-*b*, and further, configure relay device 140-*b* such that exciter 120-*b* is coupled to GCU 130-*b*.

Accordingly, for example, controller 115-*b* provides a three-phase controlled voltage and frequency to the exciter 120-*a* (e.g., via switching device K7) (at 'Start Exc'). In the example, controller 115-*a* provides a three-phase controlled voltage and frequency to the three-phase main stator of VFSG 110-*a*, via switching device K5. That is, for example, the engine start system 105 supports providing a three-phase controlled voltage and frequency to the three-phase main stator of VFSG 110-*a*, via switching device K2, switching device K9, ATRU 125-*a*, controller 115-*a*, and switching device K5.

Once the start sequence has been completed, the engine start system 105 may return the associated controllers to performing other suitable functions (e.g., functions different from the start sequence), the engine start system 105 may return the switching devices K (e.g., switching device K1, switching device K4, switching device K8, and switching device K9) and the relay devices 140 to positions associated with a generate mode described herein (e.g., as described with reference to FIG. 5). In one or more embodiments, for the VFSG 110-*b* in generate mode, one phase of the corresponding three-phase exciter 120-*b* is shorted to allow for normal 2-wire DC excitation to be provided by the corresponding GCU 130-*b*.

FIG. 5 illustrates an example configuration of the engine start system 105 in accordance with one or more embodiments of the present disclosure. FIG. 5 illustrates an example in which VFSG 110-*a* and VFSG 110-*b* are both in generate mode.

In some cases, FIG. 5 illustrates an example of a mode of operation of the engine start system 105 to which the engine start system 105 may default or return when not in an engine start mode described with reference to FIGS. 3 and 4. Referring to FIG. 5, the associated controllers close switching device K1, switching device K2, switching device K3, and switching device K6, and the remaining connectors K4, K5, K7, K8, and K9 are in an open state. The associated controllers configure relay device 140 such that exciter 120-*a* is coupled to GCU 130-*a*, and further, configure relay device 140-*b* such that exciter 120-*b* is coupled to GCU 130-*b*.

In an example, ACMP 145-*a* and ACMP 145-*b* may provide hydraulic power (hydraulic pressure) to other components (e.g., engine thrust reversers, primary flight controls, landing gear, flaps/slats, and the like) of the aircraft 100 based on power respectively generated by VFSG 110-*a* and VFSG 110-*b*.

The systems and techniques described herein provide several technical improvements compared to other engine start techniques. The example aspects of engine start system 105 as described herein provide for improved VFSG start performance and efficiency, increased start torque capability through field strengthening, and extended constant torque region through field weakening. The example aspects of engine start system 105 enable higher impedances in the main machine, which supports optimization (e.g., weight reduction) of the main machine of generator design. The example aspects of engine start system 105 enable optimization of the generator design through control of excitation frequency associated with engine startup.

Aspects of the engine start system 105 support improved design of an excitation system for various target frequencies (e.g., a fixed frequency, a narrow frequency range, and the like) because of the controller 115 capabilities for setting the excitation frequency. Aspects of the engine start system 105 support reduced size and weight of an exciter, as the engine start system 105 supports increasing the excitation frequency to the high end of the frequency spectrum.

The example aspects of engine start system 105 may be implemented with existing technology (e.g., motor controllers and system interconnects), which supports efficient integration into existing aircraft systems.

The example aspects of the engine start system 105 as described herein may be advantageously implemented without increasing the complexity of the GCU. For example, some systems utilize a three phase exciter drive for excitation control in the controller (e.g., Integrated Converter Controller (ICC)). In such systems, three phase excitation is used during start mode and DC excitation is used for generate mode, such that several switches are idle during generate mode. Such systems implement output filters to accommodate the change in modes, which increases the complexity of the GCU. In contrast, the techniques described herein enable to the use of existing or traditional GCUs with a DC excitation system.

Figure 6:
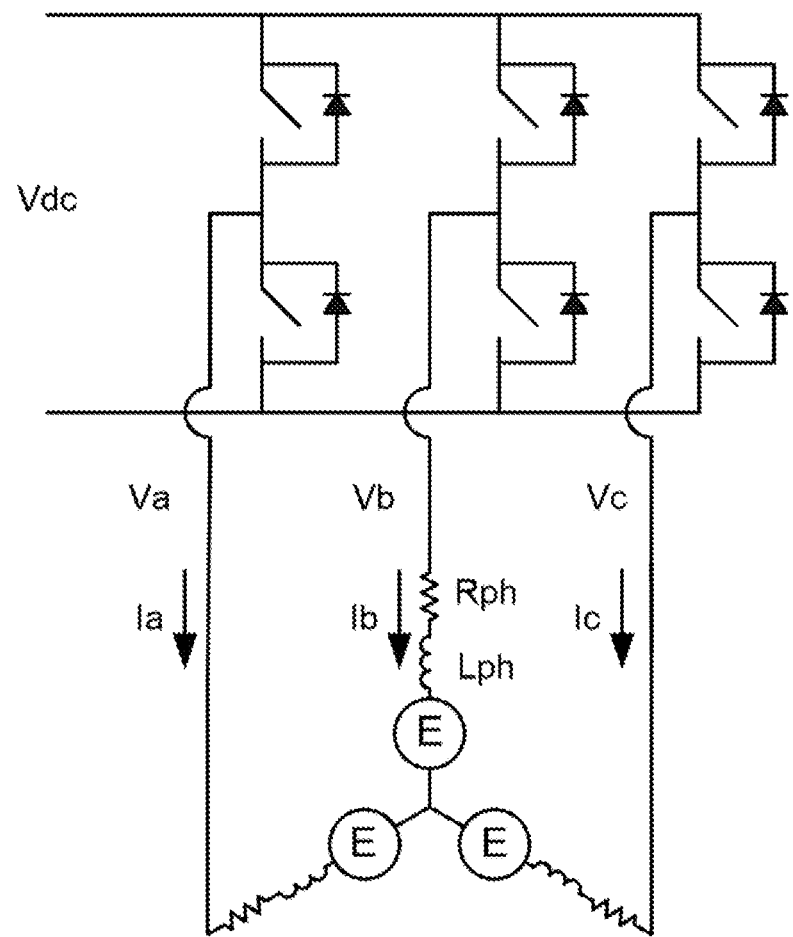
FIG. 6 is a schematic illustration of a three-phase start exciter implemented in some other systems.

FIG. 6 is a schematic illustration 600 of a three-phase start exciter implemented in some other systems. Aspects of the exciter are described herein for illustrating shortcomings and drawbacks of the exciter of other systems compared to the systems and techniques described herein.

In some other techniques which incorporate a VFSG for producing the force associated with starting a turbine engine, during start the motor controller is injecting currents into the machine. In order to maintain torque, the voltage ($V_a$, $V_b$ and $V_c$) is maintained to be greater than the back EMF (E) and the voltage drop due to Rph and Lph. In some VFSG systems, the back EMF will increase with speed because the excitation source is a fixed voltage, and at the time of the start the excitation source will be a fixed frequency.

The exciter is a wound rotor induction machine running at negative slip. In the system illustrated at FIG. 6, increasing torque capability over the speed range is achieved by increasing VDC or reducing Lph, because the Back-EMF (E) is uncontrolled and not linear. Because the input voltage to the exciter is fixed, the slip of the machine changes such that the back EMF increases as the speed increases. The variable input frequency associated with the back EMF creates the non-linear behavior in the excitation system. As a result, the back EMF of the system changes not only with excitation frequency, but also as the speed of the unit increases. Accordingly, other approaches size the exciter for the low excitation frequency and low speed to produce enough break away torque at zero speed. However, when the machine is excited at high frequency, this leads to extremely high back EMFs as the speed increases. As a result of the high back EMFs, the motor controller cannot overcome impedance of the machine and the back EMF, resulting is degraded torque capability as speed increases Such architectures associated with other approaches force multiple compromises. Some compromises include a larger exciter due to sizing for low excitation frequency. Some compromises include a motor controller which utilizes field weakening techniques, at the cost of additional input power. However, if the additional input power is not available, then such approaches include one or both of following actions in order to achieve the start torque requirements: the main machine size is increased in order to lower the commutating reactance of the machine, or the bus voltage to the motor controller is increased.

In the descriptions of the methods herein, the operations may be performed in a different order than the order shown, or the operations may be performed in different orders or at different times. Certain operations may also be left out of the method, one or more operations may be repeated, or other operations may be added to the methods.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As used herein, the terms "first" and "second" may be used to reference various components regardless of importance and/or order and are used to distinguish a component from another without limiting the components. For example, a first VFSG and a second VFSG may indicate devices different from each other regardless of the order or importance of the devices. For example, a first component may be denoted a second component, and vice versa without departing from the scope of the present disclosure. A first voltage (or frequency) may be denoted a second voltage (or frequency), and vice versa without departing from the scope of the present disclosure.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An engine start system comprising:
   a first variable frequency start generator (VFSG) that includes a first exciter and a first stator;
   a second VFSG that includes a second exciter and a second stator;
   a first motor controller and a second motor controller; and
   a switching system configured to:
     operatively connect the first motor controller to the first stator or the second exciter; and
     operatively connect the second motor controller to the first exciter or the second stator,
     wherein in a first mode of operation of the engine start system, the switching system is configured such that:

the first motor controller is operatively connected to the second exciter based on a first switch configuration of the switching system;
the second motor controller is operatively connected to the second stator based on the first switch configuration;
the first VFSG generates power;
the first motor controller provides a first controlled voltage and frequency to the second exciter based on at least one of:
the power generated by the first VFSG; and
other power generated by a power source different from the first VFSG; and
the second motor controller provides a second controlled voltage and frequency to the second stator based on the power generated by the first VFSG.

2. The engine start system of claim 1, wherein in a second mode of operation of the engine start system, the switching system is configured such that:
the first motor controller is coupled to the first stator based on a second switch configuration of the switching system;
the second motor controller is coupled to the first exciter based on the second switch configuration;
the second VFSG generates second power;
the second motor controller provides a third controlled voltage and frequency to the first exciter based on the second power generated by the second VFSG; and
the first motor controller provides a fourth controlled voltage and frequency to the first VFSG based on the second power generated by the second VFSG.

3. The engine start system of claim 1, wherein in the first mode of operation of the engine start system, the switching system is configured such that:
the first exciter is electrically coupled to first generator control circuitry of the engine start system; and
the first VFSG generates the power based on a DC excitation of the first exciter by the first generator control circuitry.

4. The engine start system of claim 1, wherein in a second mode of operation of the engine start system, the switching system is configured such that:
the first exciter is electrically coupled to first generator control circuitry of the engine start system;
the first VFSG generates the power based on a DC excitation of the first exciter by the first generator control circuitry;
the second exciter is electrically coupled to second generator control circuitry of the engine start system; and
the second VFSG generates second power based on a DC excitation of the second exciter by the second generator control circuitry.

5. The engine start system of claim 1, wherein the first controlled voltage and frequency and the second controlled voltage and frequency are each a three-phase controlled voltage and frequency.

6. The engine start system of claim 1, a first configuration of the switching system is associated with the first mode.

7. The engine start system of claim 1, wherein the switching system is configured to:
operatively connect the first motor controller to the first VFSG or the second VFSG; and
operatively connect the second motor controller to the first VFSG or the second VFSG.

8. The engine start system of claim 1, wherein the first exciter and the second exciter are each a three-phase exciter, and wherein in the first mode of operation of the engine start system, the switching system is configured such that:
the first exciter is in a direct current (DC) excitation mode; and
the second exciter is in a three-phase excitation mode.

9. A method of controlling an engine start system of an aircraft comprising a first variable frequency start generator (VFSG) and a second VFSG, the method comprising, in a first mode of operation of the engine start system:
operatively connecting a first motor controller to an exciter of the engine start system, based on a first switch configuration associated with the first mode of operation, wherein:
the first motor controller is included in the engine start system; and
the exciter is included in the second VFSG;
operatively connecting a second motor controller to a stator of the second VFSG based on the first switch configuration;
generating, by the first VFSG, power;
providing, by the first motor controller, a first controlled voltage and frequency to the exciter included in the second VFSG, based on at least one of:
the power generated by the first VFSG; and
other power generated by a power source different from the first VFSG; and
providing, by the second motor controller, a second controlled voltage and frequency to the stator of the second VFSG based on the power generated by the first VFSG,
wherein the first mode of operation is associated with starting at least one gas turbine engine of the aircraft.

10. The method of claim 9, further comprising, in a second mode of operation of the engine start system:
operatively connecting the second motor controller to an exciter included in the first VFSG, based on a second switch configuration associated with the second mode of operation;
operatively connecting the first motor controller to a stator of the first VFSG based on the second switch configuration;
generating, by the second VFSG, second power;
providing, by the second motor controller, a third controlled voltage and frequency to the exciter included in the first VFSG, based on the second power generated by the second VFSG; and
providing, by the first motor controller, a fourth controlled voltage and frequency to the first VFSG based on the second power generated by the second VFSG,
wherein the second mode of operation is associated with starting the at least one gas turbine engine of the aircraft.

11. The method of claim 9, further comprising:
electrically coupling the exciter to first generator control circuitry of the engine start system based on the first switching configuration; and
controlling, by the first generator control circuitry, a DC excitation of the first exciter, wherein the first VFSG generates the power based on the DC excitation of the exciter.

12. The method of claim 9, further comprising, in a second mode of operation of the engine start system:
electrically coupling the exciter to first generator control circuitry of the engine start system based on a second switching configuration associated with the second mode of operation;

controlling, by the first generator control circuitry, a DC excitation of the exciter, wherein the first VFSG generates the power based on the DC excitation of the exciter;
electrically coupling an exciter included in the first VFSG to second generator control circuitry of the engine start system based on the second switch configuration; and
controlling, by the second generator control circuitry, a DC excitation of the exciter included in the first VFSG, wherein the second VFSG generates second power based on the DC excitation of the exciter included in the first VFSG.

13. The method of claim 9, wherein the first controlled voltage and frequency and the second controlled voltage and frequency are each a three-phase controlled voltage.

14. The method of claim 9, further comprising:
controlling switching circuitry based on the first mode and the first switching configuration,
wherein operatively connecting the first motor controller and the exciter, operatively connecting the second motor controller to the second VFSG, or both is based on controlling the switching circuitry.

15. An aircraft electrical architecture comprising:
a variable frequency start generator (VFSG);
a motor controller;
an exciter; and
at least one gas turbine engine,
wherein:
the VFSG is operable to generate power in a first mode of operation associated with the aircraft electrical architecture; and
the VFSG is operable to generate a force associated with rotating a shaft included in the at least one gas turbine engine in a second mode of operation associated with the aircraft electrical architecture, based on second power provided by an auxiliary power source associated with the aircraft electrical architecture,
wherein the auxiliary power source comprises at least one of:
a second VFSG comprised in the aircraft electrical architecture; or
a power generator different from the second VFSG,
wherein:
the second VFSG is operable to generate a second force associated with rotating the shaft in the first mode of operation, based on the power generated by the VFSG or third power provided by a second auxiliary power source external to the aircraft electrical architecture; and
the second VFSG is operable to generate the second power in the second mode of operation,
wherein in the first mode of operation:
the motor controller is operable to provide a controlled voltage and frequency to the exciter based on the power generated by the VFSG, wherein the exciter is included in the second VFSG; and
the second VFSG generates a second force associated with rotating the shaft in the first mode, based on the controlled voltage.

16. The aircraft electrical architecture of claim 15, wherein in the second mode of operation:
the motor controller is operable to provide a second controlled voltage and frequency to the exciter based on the second power provided by the auxiliary power source; and
the second VFSG generates the second force associated with rotating the shaft in the second mode, based on the controlled voltage.

17. The aircraft electrical architecture of claim 15, further comprising:
a starter switching system configured to operatively connect the motor controller to the exciter or a second exciter,
wherein the second exciter is included in the VFSG.

* * * * *